(12) United States Patent
Maruo et al.

(10) Patent No.: US 8,171,787 B2
(45) Date of Patent: May 8, 2012

(54) LIQUID-LEVEL DETECTING APPARATUS

(75) Inventors: Hisafumi Maruo, Makinohara (JP); Takahiro Miyakawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 440 days.

(21) Appl. No.: 12/428,659

(22) Filed: Apr. 23, 2009

(65) Prior Publication Data
US 2009/0266157 A1 Oct. 29, 2009

(30) Foreign Application Priority Data

Apr. 24, 2008 (JP) ................. P. 2008-114067

(51) Int. Cl.
*G01F 23/32* (2006.01)
(52) U.S. Cl. ........................... 73/317; 73/313
(58) Field of Classification Search .................. None
See application file for complete search history.

(56) References Cited

U.S. PATENT DOCUMENTS

| 5,341,679 | A | * | 8/1994 | Walkowski et al. | ............ | 73/317 |
| 5,746,088 | A | * | 5/1998 | Sawert et al. | ............ | 73/317 |
| 6,681,628 | B2 | * | 1/2004 | Sawert et al. | ............ | 73/317 |
| 6,851,315 | B2 | * | 2/2005 | Bergsma et al. | ............ | 73/317 |
| 6,886,403 | B2 | * | 5/2005 | LaBarge et al. | ............ | 73/304 C |
| 7,343,799 | B2 | * | 3/2008 | Nagakura et al. | ............ | 73/317 |
| 7,350,413 | B2 | * | 4/2008 | Nagakura et al. | ............ | 73/317 |
| 2003/0037612 | A1 | * | 2/2003 | Nagakura et al. | ............ | 73/313 |

FOREIGN PATENT DOCUMENTS

JP 2003-257717 9/2003

* cited by examiner

*Primary Examiner* — Hezron E Williams
*Assistant Examiner* — Mark A Shabman
(74) *Attorney, Agent, or Firm* — Finnegan, Henderson, Farabow, Garrett & Dunner,L.L.P.

(57) ABSTRACT

A liquid-level detecting apparatus is provided. The liquid-level detecting apparatus includes a resistance plate with an insulating substrate; conductive segments on the insulating substrate at substantially equal intervals; a resistor mounted on the conductive segments and through which the conductive segments are connected to each other; an conductive sliding arm including a contact part for selectively coming into sliding contact with a portion of the conductive segments; a conducting pattern which is formed between one or more pairs of two adjacent conductive segments to short-circuit the two adjacent conductive segments; and a measuring device which is connected to one of the conductive segments and measures a value based on a portion of the resistor connected between a first segment of the conductive segments contacted by the contact part and the one of the conductive segments connected to the measuring device, thereby detecting a level of the liquid surface.

9 Claims, 7 Drawing Sheets

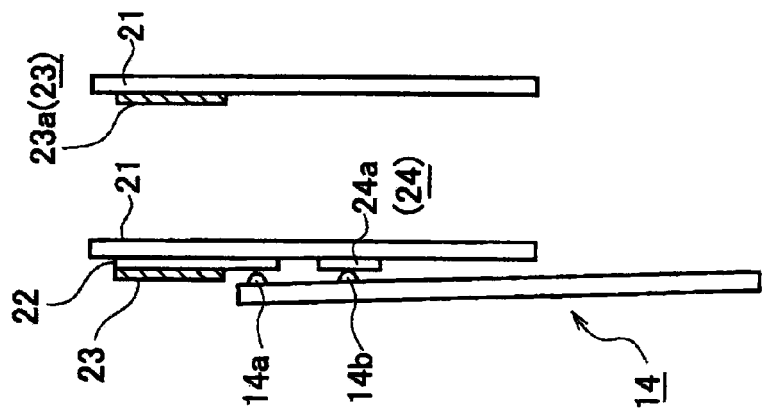
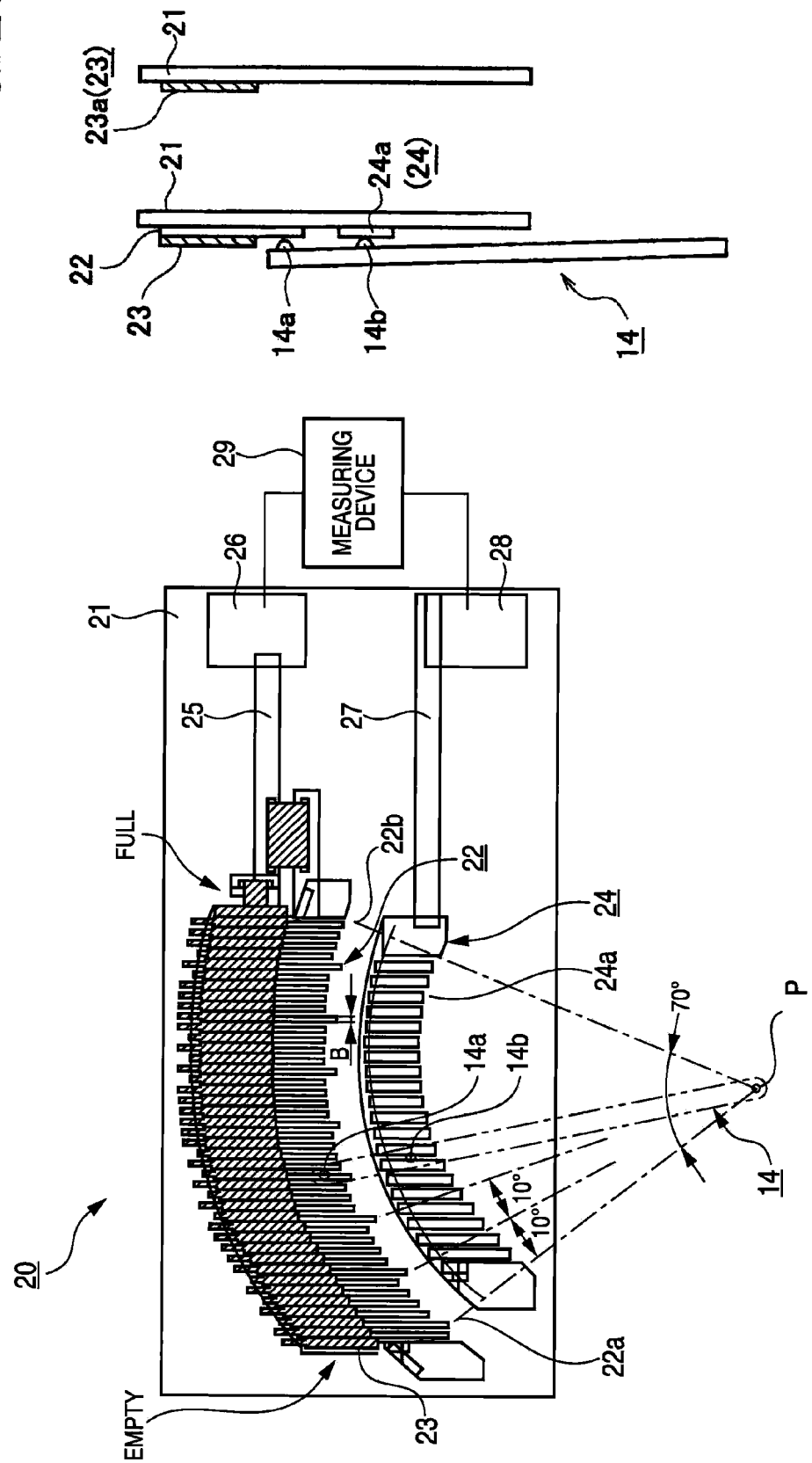

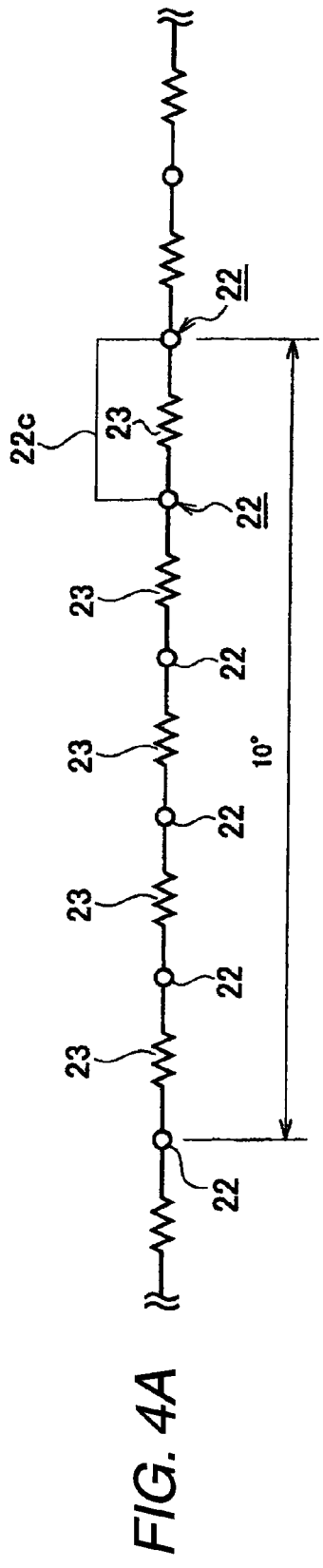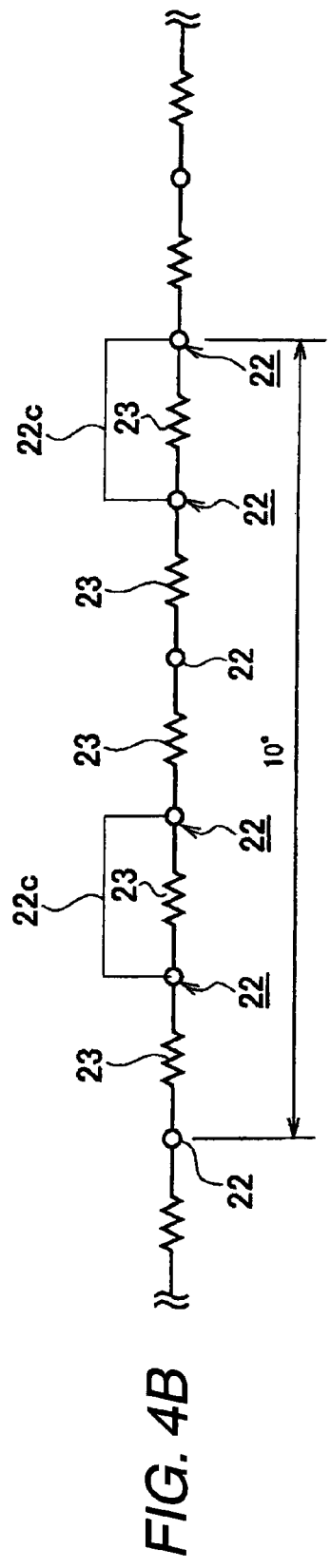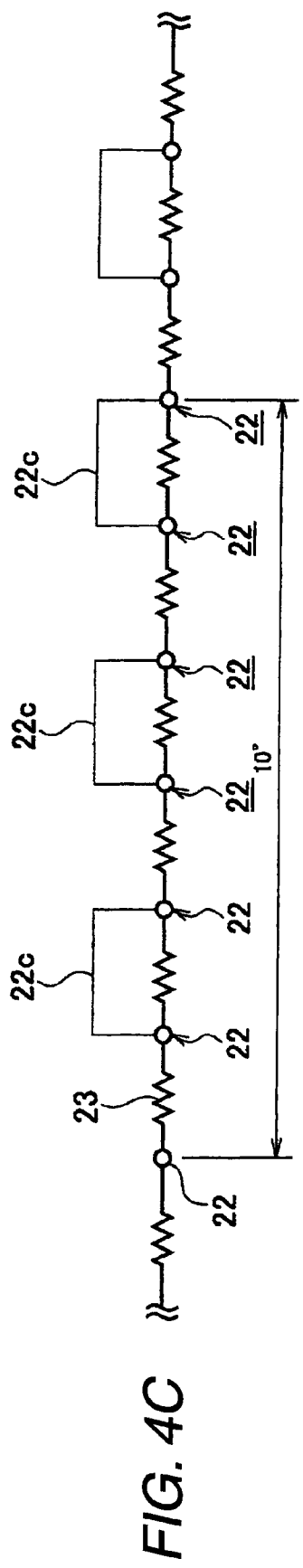

LIQUID-LEVEL DETECTING APPARATUS

BACKGROUND OF THE INVENTION

1. Technical Field

The present invention relates to a liquid-level detecting apparatus for detecting a level of a liquid surface and, more particularly, to detecting a level of fuel in a vehicle.

2. Brief Description of the Related Art

A related art liquid-level detector in the fuel tank or the liquid tank detects a variation of the level of a liquid surface by using a conductive sliding arm that rotates in cooperation with a float floating on the liquid surface. The conductive sliding arm slides on a detector plate, and a value of combined resistors connected to conductive segments formed at substantially equal intervals on an insulating substrate of the detector plate or a voltage value based on the combined resistance value is measured corresponding to the rotation of the conductive sliding arm.

For example, JP-A-2003-257717 describes such a related art liquid-level detector. JP-A-2003-257717 also describes a method for trimming the resistors of the liquid-level detector to adjust a resistance value to a desired resistance value.

FIG. 7 is schematic view of a related art liquid-level detector. FIG. 8 is an enlarged front view of the detector plate shown in FIG. 7.

The related art liquid-level detector 100 shown in FIG. 7 is described in JP-A-2003-257717. Here, the liquid-level detector is briefly described by referring to FIGS. 7 and 8.

As shown in FIG. 7, in the related art liquid-level detector 100, a float 101 floating on a liquid surface L in a fuel tank for accommodating fuel of a motor vehicle is connected to an end part of a connector arm 102 and a base end side of the connector arm 102 is supported by a detector main body 103 so as to freely rotate.

Further, in the detector main body 103, a conductive sliding arm 104 having an electric conductivity is provided so as to rotate about a center P of rotation in cooperation with the rotation of the connector arm 102. Further, the conductive sliding arm 104 slides on a detector plate 110 provided in the detector main body 103 in accordance with the rotation of the connector arm 102.

Then, as described by FIG. 8, the conductive sliding arm 104 that rotates through the connector arm 102 in cooperation with the float 101 floating on the liquid surface L is allowed to slide on the detector plate 110. Resistors 113 are connected respectively to first conductive segments 112 and are formed to be mounted on the conductive segments 112 on an insulating substrate 111 of the detector plate 110. A combined resistance value of the resistors 113 or a voltage value based on the combined resistance value is measured corresponding to the rotation of the conductive sliding arm 104 to detect the level of the liquid surface L.

Here, as shown in an enlarged view in FIG. 8, in the above-described detector plate 110, first conductive segments 112 are formed in a rectangular shape in an area of the upper part of the insulating substrate 111 that is separated from the center P of the rotation of the conductive sliding arm 104, and mutually adjacent conductive segments 112 are connected together through the resistors 113.

Further, in an area of the lower part of the insulating substrate 111 that is closer to the center P of the rotation of the conductive sliding arm 104, a conductive section 114 is formed. In the conductive section 114, second conductive segments 114a are formed correspondingly to the first conductive segments 112.

Further, at one end side of the first conductive segments 112, a first end part land 112a is formed. At one end side of the second conductive segments 114a, a second end part land 114b is formed. A measuring device 115 is connected between the first and second end part lands 112a and 114b.

In the right part of FIG. 8, a state is shown that the resistance value of a suitable resistor 113 formed between the mutually adjacent first conductive segments 112 and 112 is adjusted to a desired value by a trimming T.

On the conducting sliding arm 104 having the electric conductivity, a first contact part 104a that selectively comes into sliding contact with the first conductive segments 112 and a second contact part 104b that selectively comes into sliding contact with the second conductive segments 114a are provided that are spaced away from each other.

Then, when the conductive sliding arm 104 rotates on the center P of the rotation, the first and second contact parts 104a and 104b selectively come into sliding contact with the first and second conductive segments 112 and 114a corresponding to the rotating position of the conductive sliding arm 104.

In the related art liquid-level detector 100, when the conductive sliding arm 104 rotates on the center P of the rotation through the connector arm 102 in cooperation with the float 101 floating on the liquid surface L, only the resistors 113 existing between a segment 112 with which the first contact part 104a comes into sliding contact and the first end part land 112a connected to the first conductive segment 112 disposed at the other end side are connected in series to the measuring device 115 as shown by an arrow of FIG. 8, so that a combined resistance value of the resistors 113 can be measured by the measuring device 115 to detect the level of the liquid surface L in accordance with the combined resistance value or the voltage value based on the combined resistance value.

In the related art liquid-level detector 100, the variation of the float 101 floating on the liquid surface L is transferred to the connector arm 102 and the conductive sliding arm 104, and the level of the liquid surface L can be detected in accordance with the combined resistance value of the resistors 113 existing between the segment 112 with which the first contact part 104a comes into sliding contact correspondingly to the rotating position of the conductive sliding arm 104 sliding on the resistance plate 110 and the first end part land 112a or the voltage value based on the combined resistance value. In the detector plate 110, a material of the resistors 113 or a pattern width B of the first conductive segments 112 formed on the insulating substrate 111 is preset in order that the liquid-level detector 100 may be mass-produced.

However, in the previously standardized resistance plate 110, the resistor 113 formed between the first conductive segments 112 and 112 that are adjacent to each other on the insulating substrate 111 is desired to be changed to a value smaller than a resistance value set at the time of standardization from a user.

Moreover, the geometry of the liquid-level detector 110 creates constraints in the detector plate 110. For example, a rotation range of the conductive sliding arm 104 is typically set in advance to rotate within a range of rotating angle of, for example, 70°. Further, it is typical for the combined resistance value of the resistors 113 to be about 10Ω within a range of 10° of rotation of the conductive sliding arm 104. However, there is a disadvantage in the related art liquid-level detector 100 in that when the user requests to obtain the combined resistance value or the voltage value based on the combined resistance value of about 5Ω substantially half times or less as high as the above-described value at the time of the standard design within the range of 10° due to a reason of the form of a fuel tank not shown in the drawing, since the previously standardized resistance plate 110 cannot be directly applied, an inconvenience occurs.

Additionally, since in the above cases, in order to change the material of the resistors 113, and to change the pattern width B of the segments 112, redesign of the resistance plate 110 is required, a design cost and production cost are greatly increased, and the related art liquid-level detecting unit 100 cannot be rapidly and inexpensively provided.

Thus, a liquid-level detecting apparatus is desired that a request for reducing the resistance value from a user can be simply realized to the resistors provided in the previously standardized resistance plate.

SUMMARY OF THE INVENTION

According to an illustrative aspect of the present invention, there is provided a liquid-level detecting apparatus. The liquid-level detecting apparatus comprises a resistance plate which comprises an insulating substrate; a plurality of conductive segments which are arranged on the insulating substrate at substantially equal intervals; a resistor which is mounted on the plurality of conductive segments and through which the plurality of conductive segments are connected to each other; an conductive sliding arm which comprises a contact part for selectively coming into sliding contact with a portion of the plurality of the conductive segments; a conducting pattern which is formed between at least one pair of two adjacent conductive segments of the plurality of conductive segments to short-circuit the two adjacent conductive segments; and a measuring device which is connected to one of the plurality of conductive segments and measures a value based on a portion of the resistor connected between a first segment of the plurality of conductive segments contacted by the contact part and the one of the plurality of conductive segments connected to the measuring device, thereby detecting a level of the liquid surface.

Additionally, the plurality of conductive segments may be separated into a plurality of blocks, each of the plurality of blocks corresponding to a portion of a range of a rotating angle of the conductive sliding arm, so that each of the plurality of blocks includes the conducting pattern.

Additionally, the conducting pattern may be formed in an area in which the resistor is mounted on the plurality of conductive segments.

Additionally, the conducting pattern may be formed outside an area in which the resistor is mounted on the plurality of conductive segments.

Additionally, a first resistor of the resistors formed between the conductive segments that are electrically connected by the conducting pattern may be provided with a mark which indicates that the first resistor has not been trimmed.

Additionally, the liquid-level detecting apparatus may further include a conductive portion which is electrically connected to the measuring device, the conductive sliding arm may further include an additional contact part, and the conductive portion may be contacted by the additional contact part.

Additionally, the conducting pattern may electrically connect opposed surfaces of the two adjacent conductive segments.

Additionally, the conducting pattern may electrically connect longitudinal ends of the two adjacent conductive segments.

Additionally, there may be provided a fuel detector plate for a fuel-level detector for a vehicle. The fuel detector plate may include an insulating substrate; a first conductive land formed at a first end of the insulating substrate; a plurality of conductive segments which are arranged on the insulating substrate at substantially equal intervals; a conductive pattern which is formed between at least one pair of two adjacent conductive segments of the plurality of conductive segments to short-circuit the two adjacent conductive segments; a first runner which electrically connects the first conductive land to an end conductive segment of the plurality of conductive segments; a resistor which is mounted on the plurality of conductive segments and through which the plurality of conductive segments are electrically connected to each other; a conductive connection portion which is disposed on the insulating substrate and is spaced apart from the plurality of conductive segments, a length of the conductive connection portion corresponding to a length over which the plurality of connective segments are disposed; a second conductive land formed at the first end of the insulating substrate and spaced apart from the first conductive land; and a second runner which is electrically connected to the second conductive land, and to the conductive connection portion at an end corresponding to the end conductive segment.

With the above configuration, the material of the resistors or the pattern width of the conductive segments determined at the time of standardization can be directly used for the resistors provided in the previously standardized resistance plate and the resistance value can be simply changed to a value smaller than the resistance value set at the time of standardization. Accordingly, a request from a user for reducing the resistance value due to the form of a fuel tank or a liquid tank can be rapidly accepted, and the inexpensive liquid-level detecting unit good in its serviceability can be rapidly provided.

BRIEF DESCRIPTION OF THE DRAWINGS

FIGS. 2A to 2C describe an example of a resistance plate having first conductive segments formed thereon of the liquid-level detecting apparatus of FIG. 1 in which FIG. 2A shows a front view of the resistance plate, FIG. 2B shows a cross-sectional side view of an upper part of a first conductive segment, and FIG. 2C show a cross-sectional side view of a part between mutually adjacent first conductive segments;

FIGS. 4A to 4C are examples of circuit diagrams showing equivalent circuits of the first conductive segments of FIGS. 2A-2C;

DETAILED DESCRIPTION OF EXEMPLARY EMBODIMENTS

Figure 1:
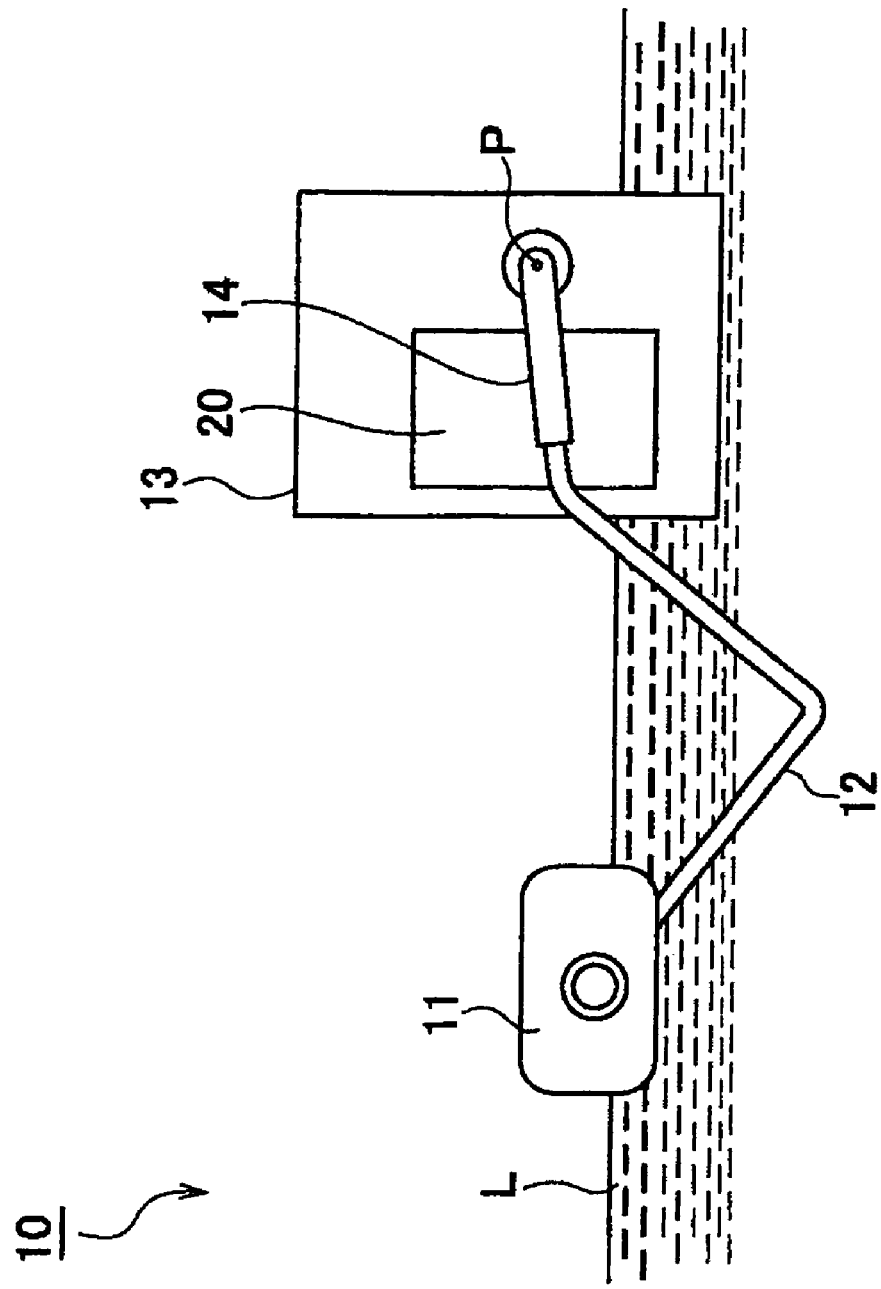
FIG. 1 is a schematic view showing an example of a liquid-level detecting apparatus according to an exemplary embodiment of the present invention.

Exemplary embodiments of the present invention will now be described with reference to the accompanying drawings, wherein like reference numerals designate like or corresponding parts throughout the several views.

FIG. 1 is a schematic view showing an example of a liquid-level detecting apparatus according to an exemplary embodiment of the present invention. FIGS. 2A to 2C describe an example of a resistance plate having first conductive segments formed thereon of the liquid-level detecting apparatus of FIG. 1 in which FIG. 2A shows a front view of the resistance plate, FIG. 2B shows a cross-sectional side view of an upper part of a first conductive segment, and FIG. 2C show a cross-sectional side view of a part between mutually adjacent first conductive segments.

As shown in FIG. 1, a liquid-level detecting unit 10 according to an exemplary embodiment of the present invention detects a level of a liquid surface L in a liquid tank (not shown) for accommodating various kinds of liquids. For example, the liquid tank may be a fuel tank of a vehicle, and the liquid may be a fuel for the vehicle. A float 11 floating on the liquid surface L in the liquid tank is connected to an end part of a float arm 12 A base end side of the float arm 12 is supported by a detector main body 13 so as to freely rotate.

Further, the detector main body 13 has a conductive sliding arm 14 having an electric conductivity so as to rotate about a center P of rotation in cooperation with the rotation of the float arm 12. Further, the conductive sliding arm 14 slides on a resistance plate 20 provided in the detector main body 13.

As described in FIG. 2A, the conductive sliding arm 14 that rotates through the float arm 12 in cooperation with the float 11 floating on the liquid surface L is allowed to slide on the resistance plate 20. A combined resistance value of one or more resistors 23 connected respectively to a plurality of first conductive segments 22 of the resistors 23 mounted on a plurality of first conductive segments 22 formed at substantially equal intervals on an insulating substrate 21 of the resistance plate 20, or a voltage value based on the combined resistance value, is measured correspondingly to the rotation of the conductive sliding arm 14 to detect the level of the liquid surface L.

As the above-described conductive sliding arm 14, any form of the conductive sliding arm that can rotate in cooperation with the float 11 may be used.

As shown in an enlarged form in FIG. 2A, an upper part of the insulating substrate 21 of the resistance plate 20 is formed in a rectangular shape in an area separated from the center P of rotation of the conductive sliding arm 14. The plurality of first conductive segments 22 are formed on the area in parallel at substantially equal intervals along the longitudinal direction of the insulating substrate 21.

Further, the plurality of the first conductive segments 22 are respectively formed in long shapes in the directions orthogonal to the longitudinal direction of the insulating substrate 21, and spaced mutually with a pattern width B.

Further, the plurality of first conductive elements 22 are provided in blocks each of which corresponds to a given range of rotating angle. For example, one block is set for 10° of rotating angle by a part of the plurality of the first conductive segments 22 along the lotus of rotation of the conductive sliding arm 14. In such a case, seven blocks are continuously connected together so that the plurality of the first conductive segments 22 are arranged in a circular arc form along the longitudinal direction over a range of the rotating angle of about 70° in total.

Further, as shown in FIGS. 2A and 2B, on the plurality of the first conductive segments 22, the resistors 23 are mounted by a screen printing method. Accordingly, as shown in FIG. 2C, one resistor 23a (23) is formed between each pair of mutually adjacent first conductive segments 22 and 22, such that a pair of mutually adjacent first conductive segments 22 and 22 are ordinarily connected together through one resistor 23a.

In this case, when the number of the plurality of the first conductive segments 22 is denoted as N, the number of the resistors 23a formed between pairs of mutually adjacent first conductive segments 22 and 22 is (N−1), from a first conductive segment 22a of the plurality of the first conductive segments 22 disposed at one end side in the left part of FIG. 2A to a first conductive segment 22b disposed at the other end side in the right part. In other words, assuming that the first conductive segment 22a is disposed at 0° of sliding arm 14 rotation, the first conductive segment 22b is disposed at approximately 70° of sliding arm 14 rotation.

On the other hand, the insulating substrate 21 has a lower part formed in an area of the resistance plate that is closer to the center P of rotation of the conductive sliding arm 14 than the first conductive segments 22. A conductive connection pattern 24 having an electric conductivity is formed on the lower part in a long shape along the longitudinal direction of the insulating substrate 21. In the conductive connection pattern 24, a plurality of second conductive segments 24a are formed in parallel at substantially equal intervals. The plurality of the second conductive segments 24a are also arranged in a circular arc form over a range of rotating angle of, for instance, about 70° along the locus of the rotation of the conductive sliding arm 14.

The plurality of the second conductive segments 24a are integrally connected together by the conductive connection pattern 24. Thus, the plurality of the second conductive segments 24a are electrically connected together (i.e. short-circuited).

Further, in the right part on the insulating substrate 21 in FIG. 2A, the first conductive segment 22b of the plurality of the conductive segments 22 disposed in the other end side in the right part of FIG. 2A is connected to a first runner 25, and the first runner 25 is connected to a first conductive land 26. Further, the other end side opposite to one end side of the conductive connection pattern 24 is connected to a second runner 27, and the second runner 27 is connected to a second conductive land 28. The first conductive land 26 is separated from the second conductive land 28.

A resistance value measuring device 29 is connected between the first conductive land 26 and the second conductive land 28, to measure the combined resistance value of the resistors 23. Alternatively, the resistance value measuring device 29 may measure a voltage value based on the combined resistance value.

As shown in FIGS. 2A and 2B, the above-described conductive sliding arm 14 includes a first contact part 14a that selectively comes into sliding contact with the plurality of the first conductive segments 22, and a second contact part 14b that selectively comes into sliding contact with the plurality of the second conductive segments 24a. The first contact part 14a is spaced apart from the second contact part 14b.

When the conductive sliding arm 14 rotates about the center P of rotation, the first contact part 14a comes into sliding contact with a part of the first conductive segment 22 corresponding to the rotating position of the conductive sliding arm 14 in which the resistor 23 is not formed. At the same time, the second contact part 14b comes into sliding contact with the second conductive segment 24a.

In this exemplary embodiment, the first contact part 14a side of the conductive sliding arm 14 is connected to one end of the resistance value measuring device 29 through the plurality of the first conductive segments 22 and the resistors 23, whereas the second contact part 14b side of the conductive sliding arm 14 is connected to the other end of the resistance value measuring device 29 through the plurality of the second conductive segments 24a that are electrically connected together (i.e., short-circuited). Alternatively, the conductive connection part 24 may be merely formed in a circular arc shape over, for instance, a range of rotating angle of about 70° without providing the plurality of the second conductive segments 24a. As yet another alternative, the conductive sliding arm 14 may be connected to the other end of the resistance value measuring device 29 by a conductive wire.

In accordance with the rotation of the conductive sliding arm 14, the first conductive segment 22a side of the plurality of the conductive segments 22 that is disposed in the one end side of the left part of FIG. 2A indicates an empty state (EMPTY) of a tank (not shown). The first conductive segment 22b side disposed in the other end side of the right part of FIG. 2A indicates a full state (FULL) of the tank.

When the conductive sliding arm 14 rotates on the center P of rotation through the float arm 12 in cooperation with the float 11 floating on the liquid surface L, the resistors 23 existing between the first conductive segment 22 contacted with the first contact part 14a correspondingly to the rotating position of the conductive sliding arm 14 and the first conductive land 26 connected to the first conductive segment 22b disposed in the other end side through the first conductive transversely long pattern 25 are connected in series to the resistance value measuring device 29 through the first and second contact parts 14a and 14b formed in the conductive sliding arm 14. Accordingly, the combined resistance value of the resistors 23 existing between the first conductive segment 22 contacted with the first contact part 14a correspondingly to the rotating position of the conductive sliding arm 14 and the first conductive segment 22b disposed in the other end side, or the voltage value based on the combined resistance value, can be measured by the resistance value measuring device 29. Thus, the level of the liquid surface L (FIG. 1) can be detected in accordance with the combined resistance value, or the voltage value based on the combined resistance value.

Here, according to the present invention, in the resistance plate 20, the resistor 23 is formed so that neither the material of the resistors 23 formed between the first conductive segments 22 and 22 adjacent to each other on the insulating substrate 21 or the pattern width B of the first conductive segments 22 is changed in order to simply change a resistance value to a value smaller than the resistance value set at the time of standardizing the resistors 23. Now, the detail will be described below by referring to FIGS. 3 to 6A and 6B.

Figure 3A:
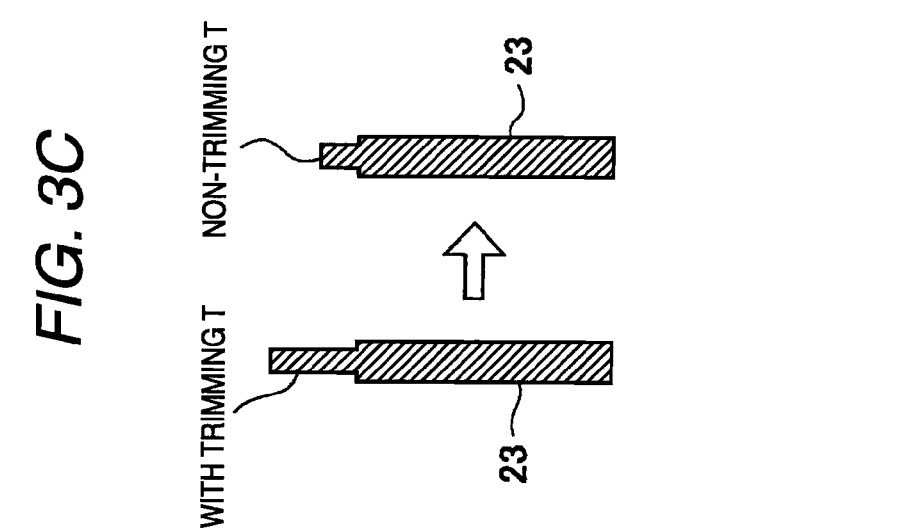
FIG. 3A is a front view showing in more detail an example of the first conductive segments of FIGS. 2A-2C.
Figure 3B:
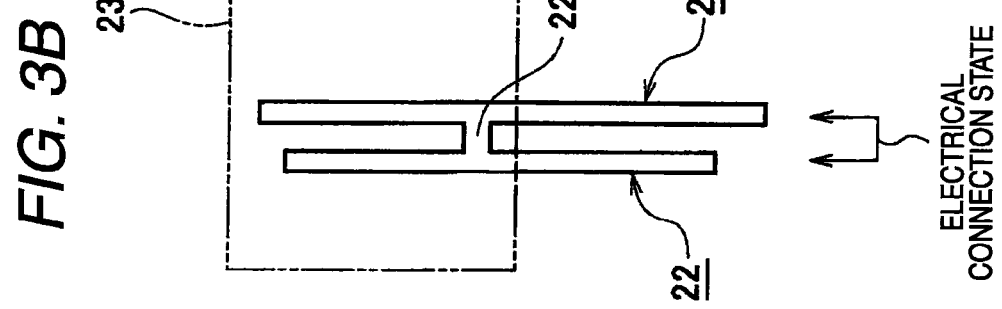
FIG. 3B is an example of an enlarged view of a part C of FIG. 3A.
Figure 3C:
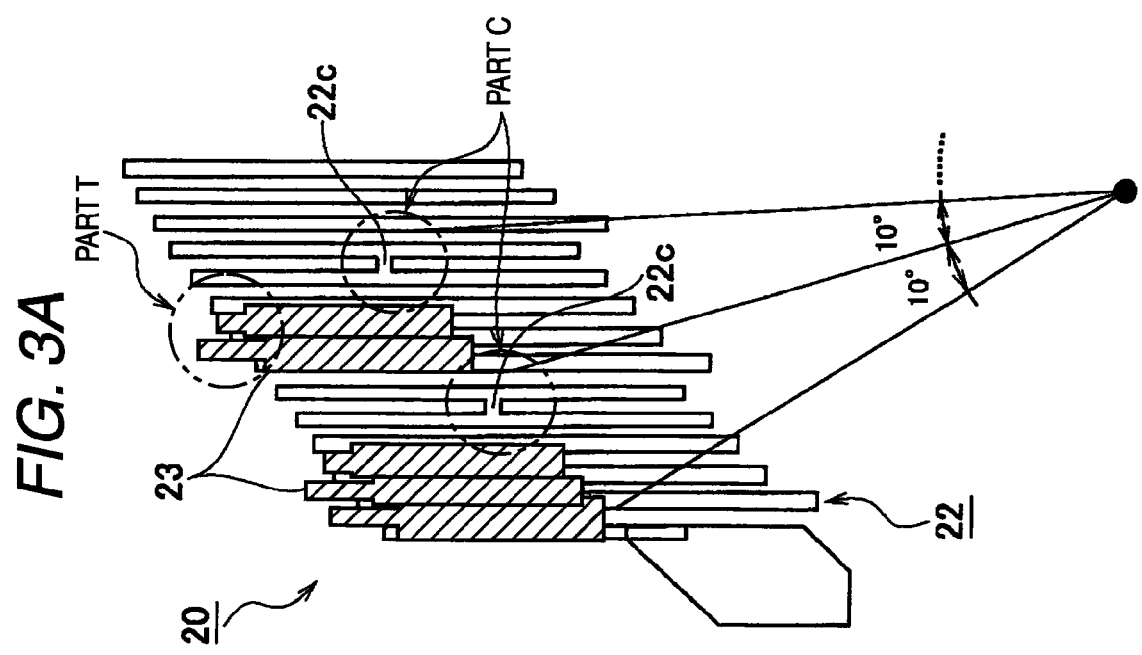
FIG. 3C is an example of an enlarged view of a part T of FIG. 3A.

FIG. 3A is a front view showing in more detail an example of the first conductive segments of FIGS. 2A-2C, FIG. 3B is an example of an enlarged view of a part C of FIG. 3A, and FIG. 3C is an example of an enlarged view of a part T of FIG. 3A. FIGS. 4A to 4C are examples of circuit diagrams showing equivalent circuits of the first conductive segments of FIGS. 2A-2C. FIGS. 5A to 5D are diagrams showing schematic examples of first conductive segments according to additional exemplary embodiments of the present invention, respectively. FIG. 6A and 6B are schematic diagrams for explaining a state in which a fault occurs with respect to the first conductive segments.

In FIG. 3A, portions of the resistors 23 are omitted in order to more clearly illustrate a position of the conducing pattern 22.

As shown in more detail in FIG. 3A, one block is set for a 10° unit by a part of the plurality of the first conductive segments 22 formed on the insulating substrate 21 (FIG. 2A) in the resistance plate 20. In this exemplary embodiment, seven blocks are continuously connected together so that the plurality of the first conductive segments 22 are arranged over a range of rotating angle of about 70° in total. The resistors 23 are mounted on the plurality of the first conductive segments 22. As shown in FIGS. 3A and 3B, one or more first conductive segments 22 and 22 which are mutually adjacent in each block of, for example, the 10° unit are electrically conducted (connected) by a conducting pattern 22c formed in a lower position in the area of the resistors 23.

In this case, the conducting pattern 22c formed in the lower position in the area of the resistors 23 is arranged at a position that does not interfere with the first contact part 14a of the conductive sliding arm 14 (see FIG. 2A). A short circuit can be formed by the one conducting pattern 22c through the conductive sliding arm 14 (see FIG. 2A).

As shown in FIGS. 3A and 3C, the resistance value of the resistors 23 formed between adjacent first conductive segments 22 and 22 may be adjusted to a desired value by a trimming T. However, since the resistors 23 formed between the mutually adjacent first conductive segments 22 and 22 that are electrically conducted (connected) by the conducting pattern 22c do not need to be trimmed to obtain the desired value, the upper end parts of the resistors 23 are shortened (i.e. marked) so that a state having no trimming T can be identified.

Here, an explanation is more specifically given by using the equivalent circuits shown in FIGS. 4A to 4C. As shown in FIG. 4A, the six first conductive segments 22 are provided within 10° set as the prescribed range of the rotating angle, and a resistor 23 is formed between each pair of adjacent first conductive segments 22 and 22, such that five resistors 23 are included in the prescribed range. When the first two adjacent first conductive segments 22 and 22 are electrically conducted (connected) together by the conducting pattern 22c, the combined resistance value, or the voltage value based on the combined resistance value, at the time of conducting (connecting) the first conductive segments 22 can be reduced to a value ⅘ times as high as the combined resistance value, or the voltage value based on the combined resistance value, when all five resistors 23 are included within the range.

Further, as shown in FIG. 4B, when another two adjacent first conductive segments 22 and 22 are electrically conducted (connected) together by the conducting patterns 22c, the combined resistance value, or the voltage value based on the combined resistance value, at the time of conducting (connecting) the first conductive segments 22 can be reduced to a value ⅗ times as high as the combined resistance value, or the voltage value based on the combined resistance value, when all five resistors 23 are included within the range.

FIG. 4C shows a case in which seven first conductive segments 22 are provided within 10° set as the prescribed range of the rotating angle and the six resistors 23 are formed between adjacent first conductive segments 22 and 22 within the prescribed range. When three pairs of adjacent first conductive segments 22 and 22 in total are alternately electrically conducted (connected) together by the conducting patterns 22c, the combined resistance value or the voltage value based on the combined resistance value at the time of conducting (connecting) the first conductive segments 22 can be reduced to a value half times as high as the combined resistance value, or the voltage value based on the combined resistance value, when all seven resistors 23 are included in the prescribed range. Thus, assuming that the combined resistance value, or the voltage value based on the combined resistance value, within the prescribed range of 10° is, for instance, about 10Ω, the combined resistance value, or the voltage value based on the combined resistance value, at the time of conducting (connecting) the conductive segments 22 is about 5Ω when the three pairs of adjacent first conductive segments 22 and 22 in total are alternately electrically conducted (connected) together by the conducting patterns 22c.

Now, in a case that adjacent first electrically segments 22 and 22 are electrically conducted (connected) together, other examples will be briefly described in which the conductive segments 22 are electrically conducted (connected) together in positions different from that of the conducting pattern 22c shown in FIGS. 3A and 3B by referring to FIGS. 5A to 5D.

Figure 5A:
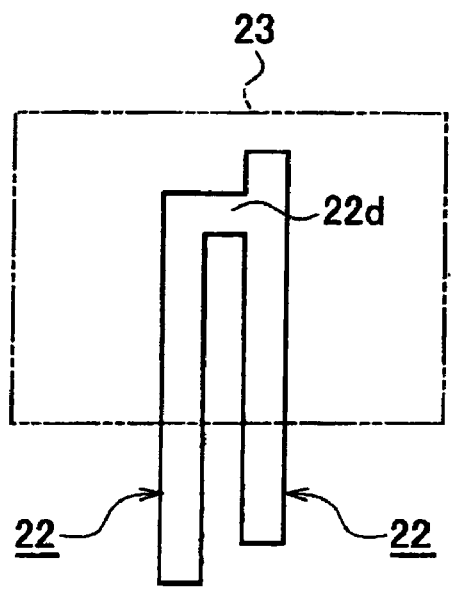
FIGS. 5A to 5D are diagrams showing schematic examples of first conductive segments according to additional exemplary embodiments of the present invention, respectively.
Figure 6A:
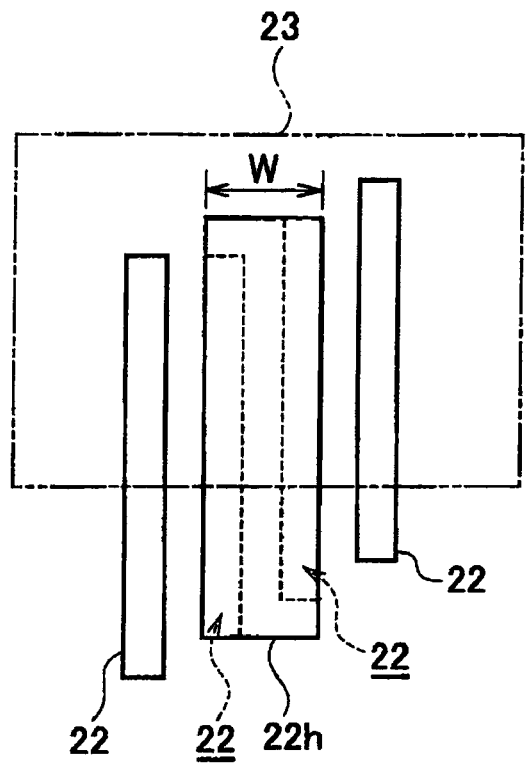
FIG. 6A and 6B are schematic diagrams for explaining a state in which a fault occurs with respect to the first conductive segments.
Figure 6B:
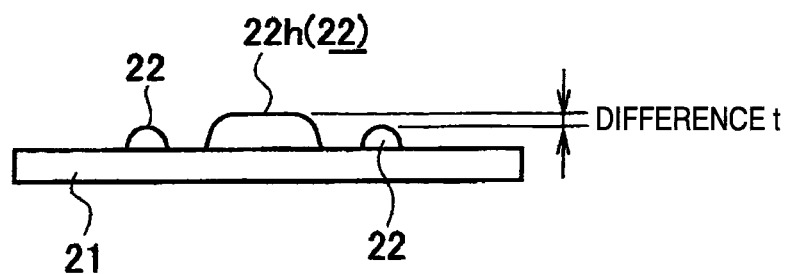
Figure 7:
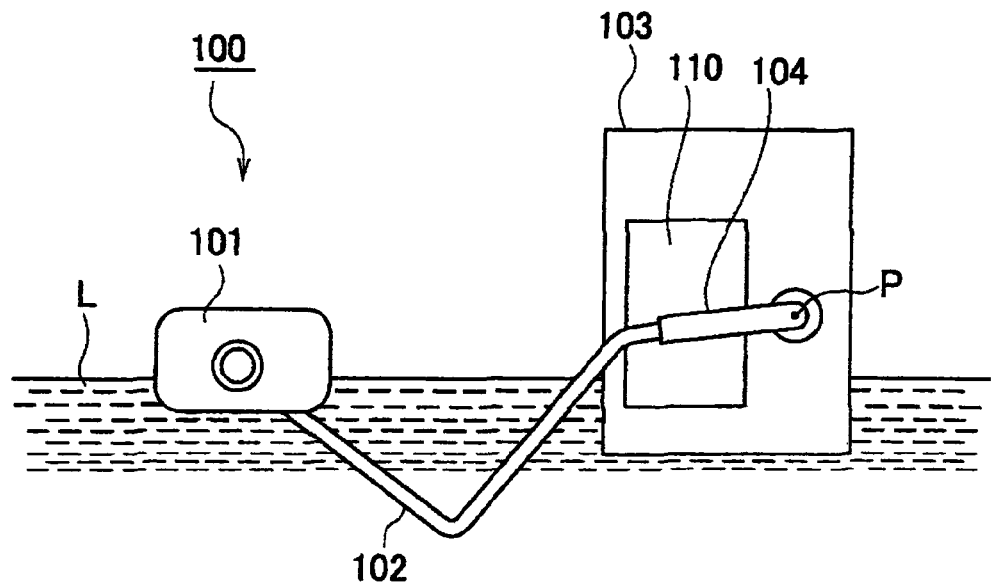
FIG. 7 is an entire schematic view showing the entire structure of a usual liquid-level detecting unit.
Figure 8:
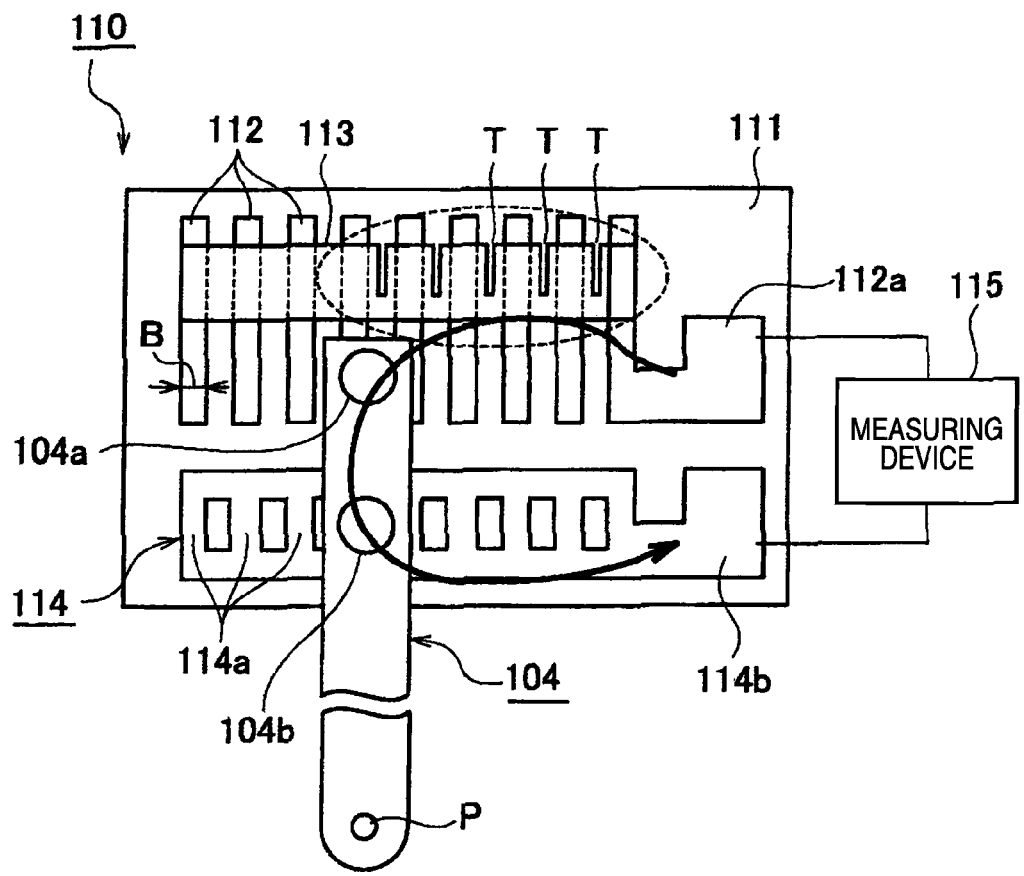
FIG. 8 is a front view showing a resistance plate shown in FIG. 7 in an enlarged form.

In another example shown in FIG. 5A, the adjacent first conductive segments 22 and 22 are electrically conducted (connected) together by one conducting pattern 22d formed in an upper position in the area of the resistor 23.

Figure 5B:
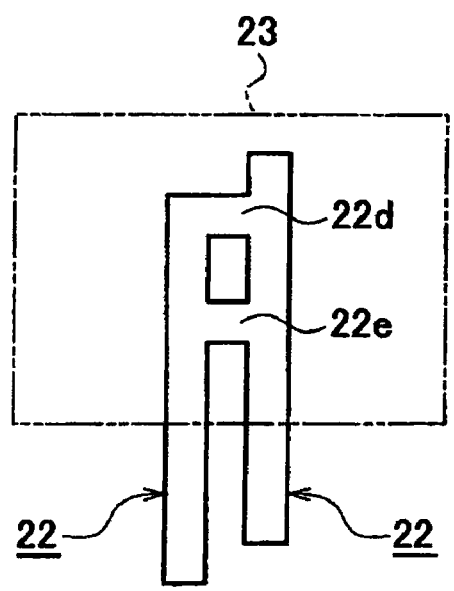

Further, in another example shown in FIG. 5B, the adjacent first conductive segments 22 and 22 are electrically conducted (connected) together by two conducting patterns 22d and 22e respectively formed in an upper position and an intermediate position in the area of the resistor 23.

Figure 5C:
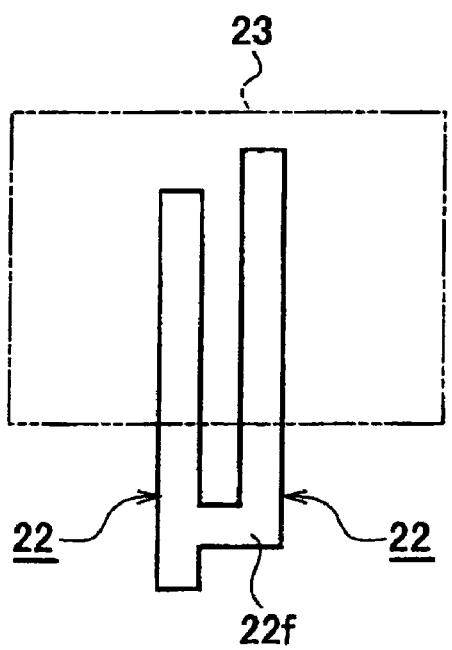

Further, in another example shown in FIG. 5C, the adjacent first conductive segments 22 and 22 are electrically conducted (connected) together by a conducting pattern 22f formed in a lower position outside the area of the resistor 23. In this case, the conducting pattern 22f is advantageously provided at a position with which the first contact part 14a of the conductive sliding arm 14 (FIG. 2A) does not come into sliding contact.

Figure 5D:
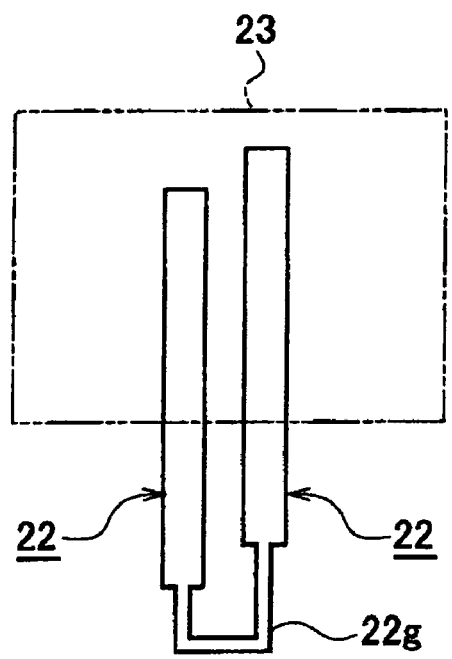

Further, in another example shown in FIG. 5D, the adjacent first conductive segments 22 and 22 are electrically conducted (connected) together by a U-shaped conducting pattern 22g formed in a U-shape in a lower position of the first conductive segments 22 and 22 respectively outside the area of the resistor 23. In this case, the U-shaped conducting pattern 22g is advantageously formed so as not to come into contact with the second conductive segments 24a.

As shown in FIGS. 5A to 5C, each of the conducting patterns 22d, 22e and 22f connects opposed surfaces of the first conductive segments 22. That is, each of the conducting patterns 22d, 22e, and 22f runs between the adjacent first conductive segments 22. On the other hand, as shown in FIG. 5D, the conducting pattern 22g connects longitudinal ends of the first conductive segments 22.

As shown in FIG. 6A, the adjacent first conductive segments 22 and 22 may be supposed to be entirely electrically conducted (connected) together by a conducting pattern 22h. However, in this case, since the pattern width W of the conducting pattern 22h is widened, a difference t of film thickness arises between the conducting pattern 22h and the peripheral first conductive segments 22 as shown in FIG. 6B. In this case, a disadvantage is created in that an abrasion resistance to the conductive sliding arm (FIG. 2A) is deteriorated.

As described above, in the plurality of the conductive segments 22 formed at substantially equal intervals on the insulating substrate 21 of the resistance plate 20, at least one or more first conductive segments 22 and 22 that are mutually adjacent are electrically conducted together by the conducting pattern 22c, so that the material of the resistors 23 or the pattern width B of the conductive segments 22 and the resistance value can be simply changed. Accordingly, as a form of a fuel tank or a liquid tank is changed, the liquid-level detector can be rapidly adapted, and an inexpensive liquid-level detecting unit 10 having good serviceability can be rapidly provided.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A liquid-level detecting apparatus, comprising:
a resistance plate which comprises an insulating substrate;
a plurality of conductive segments which are arranged on the insulating substrate at substantially equal intervals;
a resistor which is mounted on the plurality of conductive segments and through which the plurality of conductive segments are electrically connected to each other;
a conductive sliding arm which comprises a contact part for selectively coming into sliding contact with a portion of the plurality of the conductive segments;
a conducting pattern which is formed between at least one pair of two adjacent conductive segments of the plurality of conductive segments to short-circuit the two adjacent conductive segments; and
a measuring device which is connected to one of the plurality of conductive segments and measures a value based on a portion of the resistor connected between a segment of the plurality of conductive segments that is contacted by the contact part and the one of the plurality of conductive segments that is connected to the measuring device, thereby detecting a level of the liquid surface.

2. The liquid-level detecting apparatus according to claim 1,
wherein the plurality of conductive segments are separated into a plurality of blocks, each of the plurality of blocks corresponding to a portion of a range of a rotating angle of the conductive sliding arm, and
wherein each of the plurality of blocks comprises the conducting pattern.

3. The liquid-level detecting apparatus according to claim 1, wherein the conducting pattern is formed in an area in which the resistor is mounted on the plurality of conductive segments.

4. The liquid-level detecting apparatus according to claim 1, wherein the conducting pattern is formed outside an area in which the resistor is mounted on the plurality of conductive segments.

5. The liquid-level detecting apparatus according to claim 1, wherein the resistor comprises a first resistor of a plurality of resistors formed between the conductive segments that are electrically connected by the conducting pattern is provided with a mark which indicates that the first resistor has not been trimmed.

6. The liquid-level detecting apparatus according to claim 1, further comprising a conductive portion which is electrically connected to the measuring device,
wherein the conductive sliding arm further comprises an additional contact part, and
wherein the conductive portion is contacted by the additional contact part.

7. The liquid-level detecting apparatus according to claim 1, wherein the conducting pattern electrically connects opposed surfaces of the two adjacent conductive segments.

8. The liquid-level detecting apparatus according to claim 1, wherein the conducting pattern electrically connects longitudinal ends of the two adjacent conductive segments.

9. A fuel detector plate for a fuel-level detector for a vehicle, the fuel detector plate comprising:
an insulating substrate;
a first conductive land formed at a first end of the insulating substrate;
a plurality of conductive segments which are arranged on the insulating substrate at substantially equal intervals;

a conductive pattern which is formed between at least one pair of two adjacent conductive segments of the plurality of conductive segments to short-circuit the two adjacent conductive segments;

a first runner which electrically connects the first conductive land to an end conductive segment of the plurality of conductive segments;

a resistor which is mounted on the plurality of conductive segments and through which the plurality of conductive segments are electrically connected to each other;

a conductive connection portion which is disposed on the insulating substrate and is spaced apart from the plurality of conductive segments, a length of the conductive connection portion corresponding to a length over which the plurality of connective segments are disposed;

a second conductive land formed at the first end of the insulating substrate and spaced apart from the first conductive land; and a second runner which is electrically connected to the second conductive land, and to the conductive connection portion at an end corresponding to the end conductive segment.

* * * * *